(12) United States Patent
Vujcic (10) Patent No.: US 8,451,804 B2
(45) Date of Patent: May 28, 2013

(54) METHOD AND PROTOCOL FOR HANDLING ACCESS ATTEMPTS FOR COMMUNICATIONS SYSTEMS

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 796 days.

(21) Appl. No.: 12/066,240

(22) PCT Filed: Sep. 7, 2006

(86) PCT No.: PCT/KR2006/003563
§ 371 (c)(1),
(2), (4) Date: Mar. 7, 2008

(87) PCT Pub. No.: WO2007/029977
PCT Pub. Date: Mar. 15, 2007

(65) Prior Publication Data
US 2008/0298325 A1    Dec. 4, 2008

Related U.S. Application Data (60) Provisional application No. 60/715,704, filed on Sep. 8, 2005.

(51) Int. Cl.
*H04J 3/00* (2006.01)
*H04W 4/00* (2009.01)
*H04L 12/26* (2006.01)

(52) U.S. Cl.
USPC ........... 370/336; 370/252; 370/328; 370/329; 370/337

(58) Field of Classification Search
USPC ........................................................ 370/336
See application file for complete search history.

(56) References Cited

U.S. PATENT DOCUMENTS

| | | | |
|---|---|---|---|
| 6,118,788 A | 9/2000 | Kermani et al. | |
| 6,400,695 B1 | 6/2002 | Chuah et al. | |
| 6,621,803 B2 | 9/2003 | Halton et al. | |
| 6,778,835 B2 | 8/2004 | You et al. | |
| 6,859,445 B1 | 2/2005 | Moon et al. | |
| 6,917,602 B2 | 7/2005 | Toskala et al. | |
| 2001/0026539 A1* | 10/2001 | Kornprobst et al. | 370/329 |
| 2001/0036113 A1* | 11/2001 | Jurgensen et al. | 365/200 |
| 2002/0041578 A1 | 4/2002 | Kim et al. | |
| 2002/0163933 A1 | 11/2002 | Benveniste | |
| 2002/0167922 A1* | 11/2002 | Inoue et al. | 370/331 |

(Continued)

FOREIGN PATENT DOCUMENTS

| | | |
|---|---|---|
| CN | 1316867 | 10/2001 |
| EP | 0993214 | 4/2000 |

(Continued)

OTHER PUBLICATIONS

Motorola, "Proposed CR to TS 25.331 on Miscellaneous Corrections and Moving of Text from 3G TS 25.304," R2-001834, 3GPP RAN WG2#15, Aug. 2000, XP-050116176.

*Primary Examiner* — Ian N Moore
*Assistant Examiner* — Jenee Alexander
(74) *Attorney, Agent, or Firm* — Lee, Hong, Degerman, Kang & Waimey (57) ABSTRACT

An improved access attempt procedure for call establishment is achieved by deriving a probability of access transmission as a function of both a priority level for access attempts and a random access cause, and performing link establishment authentication and security control call establishment based upon the deriving.

10 Claims, 6 Drawing Sheets

U.S. PATENT DOCUMENTS

| | | |
|---|---|---|
| 2004/0032877 A1 | 2/2004 | Chuah et al. |
| 2004/0157602 A1 | 8/2004 | Khawand |
| 2004/0165529 A1 | 8/2004 | Lee |
| 2004/0224698 A1* | 11/2004 | Yi et al. .................. 455/450 |
| 2004/0264497 A1 | 12/2004 | Wang et al. |
| 2005/0026622 A1* | 2/2005 | Georgeaux et al. .......... 455/450 |
| 2006/0142020 A1* | 6/2006 | Mueckenheim et al. ..... 455/453 |

FOREIGN PATENT DOCUMENTS

| | | |
|---|---|---|
| EP | 0994604 | 4/2000 |
| EP | 1143755 | 10/2001 |
| JP | 2001-298770 | 10/2001 |
| JP | 2006-515737 | 6/2006 |
| KR | 1020060066595 | 6/2006 |
| RU | 2168278 | 5/2001 |
| TW | 507461 | 10/2002 |
| WO | 0105050 | 1/2001 |
| WO | 0139386 | 5/2001 |
| WO | 0193462 | 12/2001 |
| WO | 02067619 | 8/2002 |
| WO | 2004064272 | 7/2004 |
| WO | 2005032066 | 4/2005 |

\* cited by examiner

Figure 84: Structure of the AICH

Fig. 5

| AC  | 0 - 9  | 10     | 11     | 12     | 13     | 14     | 15     |
|-----|--------|--------|--------|--------|--------|--------|--------|
| ASC | 1st IE | 2nd IE | 3rd IE | 4th IE | 5th IE | 6th IE | 7th IE |

METHOD AND PROTOCOL FOR HANDLING ACCESS ATTEMPTS FOR COMMUNICATIONS SYSTEMS

CROSS-REFERENCE TO RELATED APPLICATIONS

This application is the National Stage filing under 35 U.S.C. 371 of International Application No. PCT/KR2006/003563, filed on Sep. 7, 2006, which claims the benefit of U.S. provisional Application Ser. No. 60/715,704, filed on Sep. 8, 2005.

TECHNICAL FIELD

The present invention relates to radio communications, and in particular, relates to managing access attempts for communication systems.

BACKGROUND ART

A radio (wireless) communication system may be comprised of an access network and a plurality of access terminals. The access network may include access points, such as Node Bs, base stations, or the like, that allow the access terminals to connect with the access network for uplink (UL: terminal-to-network) communications and downlink (DL: network-to-terminal) communications via various types of channels. The access terminals may be user equipment (UE), mobile stations, or the like.

Although the concepts described hereafter may be applicable to different types of communication systems, the Universal Mobile Telecommunications System (UMTS) will be described merely for exemplary purposes. A typical UMTS has at least one core network (CN) connected with at least one UTRAN (UMTS Terrestrial Radio Access Network) that has Node Bs acting as access points for multiple UEs.

Figure 1:
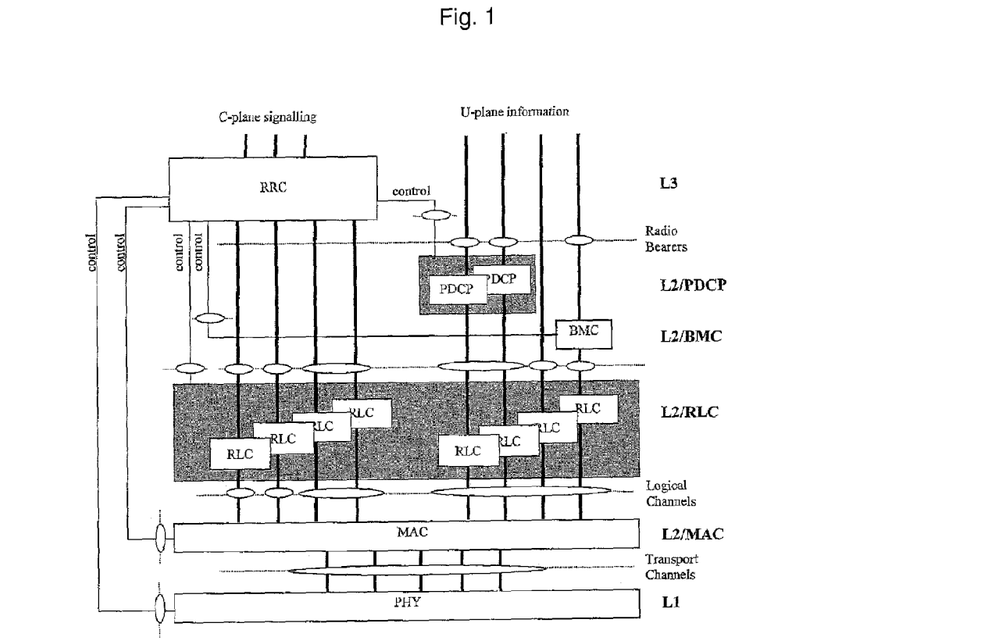
FIG. 1 shows the radio interface protocol architecture according to the 3GPP radio access network standards.

FIG. 1 shows the radio interface protocol architecture according to the 3GPP radio access network standards. The radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like.

The protocol layers in FIG. 1 can be divided into a first layer (L1), a second layer (L2), and a third layer (L3) based on the three lower layers of an open system inter-connection (OSI) standard model. The first layer (L1), namely, the physical layer (PHY), provides an information transfer service to an upper layer by using various radio transmission techniques. The physical layer is connected to an upper layer called a medium access control (MAC) layer, via a transport channel. The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer called the radio link control (RLC) layer, via a logical channel. Various logical channels are provided according to the type of information transmitted.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink, the Random Access Channel (RACH). The MAC-m sublayer may handle the MBMS data. The MAC-d sub-layer manages a dedicated channel (DCH), which is a dedicated transport channel for a specific terminal. The MAC-d sublayer is located in a serving RNC (SRNC) that manages a corresponding terminal and one MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity, and then creates data units by adding header information thereto. These data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as IPv4 or IPv6, efficiently on a radio interface with a relatively small bandwidth. For this purpose, the PDCP layer reduces unnecessary control information used in a wired network, namely, a function called header compression is performed.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally, the RRC layer handles user mobility within the RAN, and additional services, e.g., location services.

Call establishment between a UE (User Equipment) and a radio network in current wireless communications systems, such as UMTS, is performed on a RACH (Random Access Channel) according to appropriate procedures. The timing at which the UE can start a random access procedure is derived on the basis of an Access Service Class (ASC) that gives a priority level for access attempts. The random access procedure is divided into two phases: an access attempt phase, and when the access is succeeded the message transmission phase indicating an establishment cause. When the establishment cause is decoded by the network, depending upon the request and the radio resource availability, a decision is made by the network to accept or to reject the call establishment.

In general, the procedure where the UE sends a first message to the network is referred to as initial access. For this, the common uplink channel called RACH (Random Access Channel) is used. In all cases (GSM and UMTS systems), the initial access starts from the UE with the connection request message including the reason of the request, and the answer from the network indicating the allocation of radio resources for the requested reason.

There are several reasons, which may be referred to as an establishment cause, for sending a connection request message and the following list shows some examples specified in UMTS:

Originating Conversational Call,

Originating Streaming Call,

Originating Interactive Call,

Originating Background Call,

Originating Subscribed traffic Call,

Terminating Conversational Call,

Terminating Streaming Call,

Terminating Interactive Call,

Terminating Background Call,

Emergency Call,

Inter-RAT cell re-selection,

Inter-RAT cell change order,

Registration, Detach,

Originating High Priority Signalling,

Originating Low Priority Signalling,

Call re-establishment,

Terminating High Priority Signalling,

Terminating Low Priority Signalling,

Regarding the definitions of the terms used above, originating call means that the UE wants to setup a connection (for instance a speech connection), terminating call means that the UE answers to paging, while registration means that the user wants to register only to perform a location update.

To send the information over the air interface, the physical random access procedure is used. The physical random access transmission is performed under the control of a higher layer protocol, which performs some important functions related to priority and load control. These procedures differ between GSM and UMTS radio systems. The description of GSM random access procedure can be found in *The GSM System for Mobile Communications*, published by M. Mouly and M. B. Pautet, 1992. As the present innovation is UMTS enhancement/evolution related, the W-CDMA random access procedure will be described in more detailed below.

In the UMTS physical layer random access procedure, the UE randomly selects an access resource and transmits a RACH preamble part of a random access procedure to the network. The preamble is a short signal that is sent before the transmission of the RACH connection request message. The UE repeatedly transmits the preamble by increasing the transmission power every time the preamble is sent until it receives an AI (Acquisition Indicator) on an AICH (Acquisition Indicator Channel), which indicates the detection of the preamble by the network. The UE stops the transmission of the preamble once it receives the AI (Acquisition Indicator), and sends the message part at a level of power equal to the preamble transmission power at that point, plus an offset signalled by the network. This random access procedure avoids a power ramping procedure for the entire message. Such power ramping procedure would create more interference due to unsuccessful sent messages and it would be less efficient due to the larger delay, since it would take much more time to decode the message before an acknowledgement could be given that it was received successful.

The main characteristics of the RACH is that it is a contention based channel, which means that due to simultaneous access of several users, collisions may occur such that the initial access message cannot be decoded by the network. The UE can start the random-access transmission (both preambles and message) at the beginning of an access slot only. This kind of access method is therefore a type of slotted ALOHA approach with fast acquisition indication.

Figure 2:
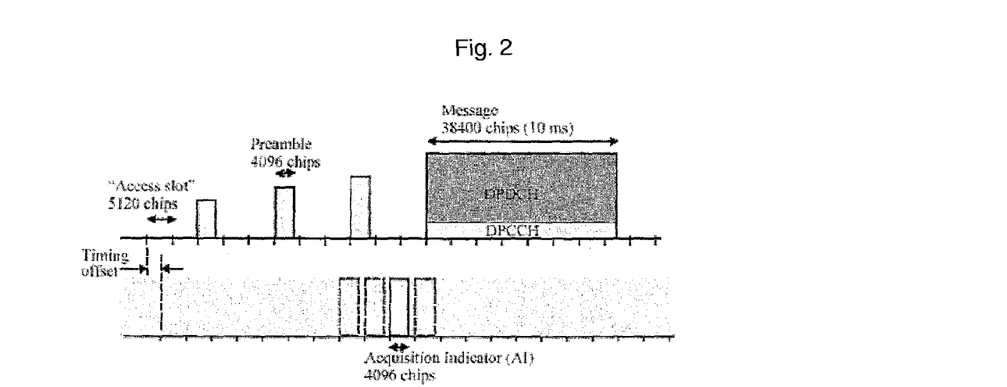
FIG. 2 shows an example of the timing (i.e. access slots) related to a random access transmission.
Figure 3:
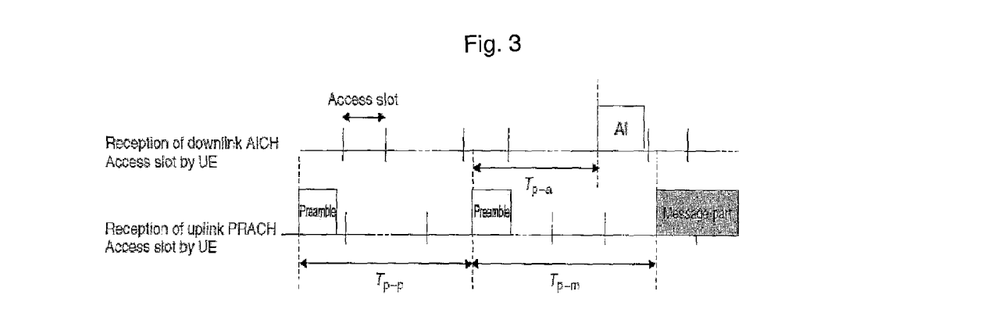
FIG. 3 shows examples of the reception of a downlink AICH access slot by the UE and the reception of an uplink PRACH access slot by the UE.

FIG. 2 shows an example of the timing (i.e. access slots) related to a random access transmission, while FIG. 3 shows examples of the reception of a downlink AICH access slot by the UE and the reception of an uplink PRACH access slot by the UE.

The time axis of both the RACH and the AICH is divided into time intervals, called access slots. There are 15 access slots per two frames (one frame is 10 ms in length or 38400 chips) and they are spaced 1.33 ms (5120 chips) apart. Information on what access slots are available for random-access transmission and what timing offsets to use between RACH and AICH, between two successive preambles and between the last preamble and the message is signalled by the network. If the AICH transmission timing is 0 and 1, it is sent 3 and 4 access slots after the last preamble access slot transmitted, respectively As for the format of the preambles, each preamble consists of 4096 chips, which is a sequence of 256 repetitions of Hadamard codes of length 16. The Hadamard codes are referred to as the signature of the preamble. There are 16 different signatures and a signature is randomly selected (from available signatures sets on the basis of ASC) and repeated 256 times for each transmission of the preamble part.

Figure 4:
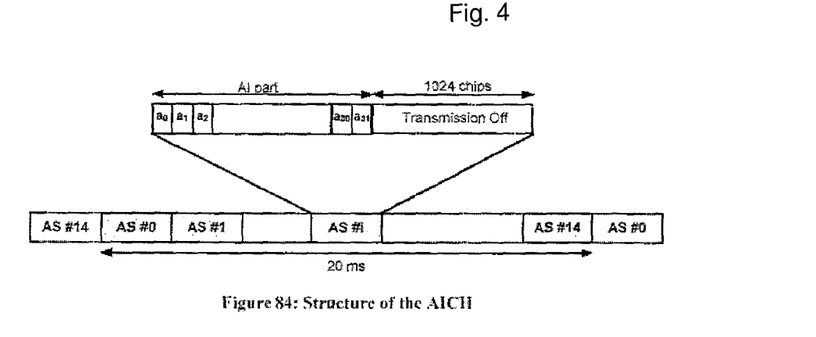
FIG. 4 shows an exemplary structure of an AICH.

FIG. 4 shows an exemplary structure (format) of the AICH. The AICH consists of a repeated sequence of 15 consecutive access slots, each having a length of 40 bit intervals (5120 chips). Each access slot consists of two parts, an Acquisition Indicator (AI) part consisting of 32 real-valued signals $a0, \ldots, a31$ and a part of duration 1024 chips where transmission is switched off.

When the network detects the transmission of a RACH preamble in a RACH access slot with a certain signature, it repeats this signature in the associated AICH access slot. This means that the Hadamard code used as the signature on the RACH preamble is modulated onto the AI part of the AICH. The acquisition indicator corresponding to the signature can take the values +1, −1, and 0, depending upon whether a positive acknowledgement, a negative acknowledgement or no acknowledgement is given to a specific signature.

A positive polarity of the signature indicates that the preamble has been acquired and the message can be sent. A negative polarity indicates that the preamble has been acquired and the power ramping procedure shall be stopped, but the message shall not be sent. This negative acknowledgement is used when there is a congestion situation in the network, and thus a transmitted message cannot be processed at the present time. In this case, the access attempt needs to be repeated some time later by the UE.

For the control of random access transmissions, the network decides whether the mobile station should be permitted to use radio access resource based primarily upon the access class to which the UE belongs. A specified priority level is implied by the Access Class (AC) which is stored on the UE SIM card.

Certain aspect of access control will be described hereafter. Regarding the purpose of access control, under certain circumstances, it will be desirable to prevent UE users from making access attempts (including emergency call attempts)

or responding to pages in specified areas of a PLMN (Public Land Mobile Network). Such situations may arise during states of emergency, or where 1 of 2 or more co-located PLMNs has failed. Broadcast messages should be available on a cell-by-cell basis indicating the class(es) of subscribers barred from network access. The use of this facility allows the network operator to prevent overload of the access channel under critical conditions. It is not intended that access control be used under normal operating conditions.

Figure 5:
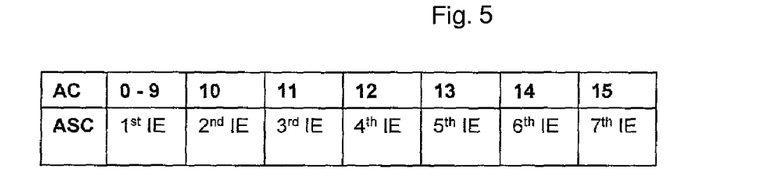
FIG. 5 shows an example of the types of access classes (AC) and their respectively related access service class (ASC) that has an information element (IE).

FIG. 5 shows an example of the types of access classes (AC) and their respectively related access service (AS), each containing an information element (IE).

For allocation, all UEs are members of one out of ten randomly allocated mobile populations, defined as Access Classes 0 to 9. The population number can be stored in a SIM/USIM for the UE. In addition, the UEs may be members of one or more out of 5 special categories (Access Classes 11 to 15), which also may be stored in the SIM/USIM. These may be allocated to specific high priority users as follows. (This enumeration is not meant as a priority sequence):

Class 15—PLMN Staff;
Class 14—Emergency Services;
Class 13—Public Utilities (e.g. water/gas suppliers);
Class 12—Security Services;
Class 11—For PLMN Use.

For operation, if the UE is a member of at least one Access Class which corresponds to the permitted classes as signalled over the air interface, and the Access Class is applicable in the serving network, access attempts are allowed. Otherwise access attempts are not allowed.

Access Classes are applicable as follows:
Classes 0~9—Home and Visited PLMNs;
Classes 11 and 15—Home PLMN only;
Classes 12, 13, 14—Home PLMN and visited PLMNs of home country only.

Any number of these classes may be barred at any one time.

For emergency calls, an additional control bit known as Access Class 10 is also signalled over the air interface to the UE. This indicates whether or not network access for Emergency Calls is allowed for UEs with access classes 0 to 9 or without an IMSI. For UEs with access classes 11 to 15, Emergency Calls are not allowed if both Access Class 10 and the relevant Access Class (11 to 15) are barred. Otherwise, Emergency Calls may be allowed.

In UMTS, the AC are mapped to Access Service Classes (ASC). There are eight different priority levels defined (ASC 0 to ASC 7), with level 0 being the highest priority.

For Mapping of Access Classes to Access Service Classes, the Access Classes shall only be applied at initial access, i.e. when sending an RRC CONNECTION REQUEST message. A mapping between Access Class (AC) and Access Service Class (ASC) shall be indicated by the information element AC-to-ASC mapping in System Information Block type 5. The correspondence between AC and ASC is indicated in FIG. 5.

In the table of FIG. 5, the $n^{th}$ IE designates an ASC number i in the range 0-7 to AC. If the ASC indicated by the $n^{th}$ IE is undefined, the UE behaviour is unspecified.

For random access, the parameters implied by the respective ASC shall be employed. In case the UE is a member of several ACs, it shall select the ASC for the highest AC number. In connected mode, AC shall not be applied.

An ASC consists of a subset of RACH preamble signatures and access slots, which are allowed to be used for this access attempt and a persistence value corresponding to a probability $Pv \leq 1$ to attempt a transmission. Another mechanism to control random access transmission is a load control mechanism, which allows reducing of the load of incoming traffic when the collision probability is high or when radio resources are low.

Figure 6:
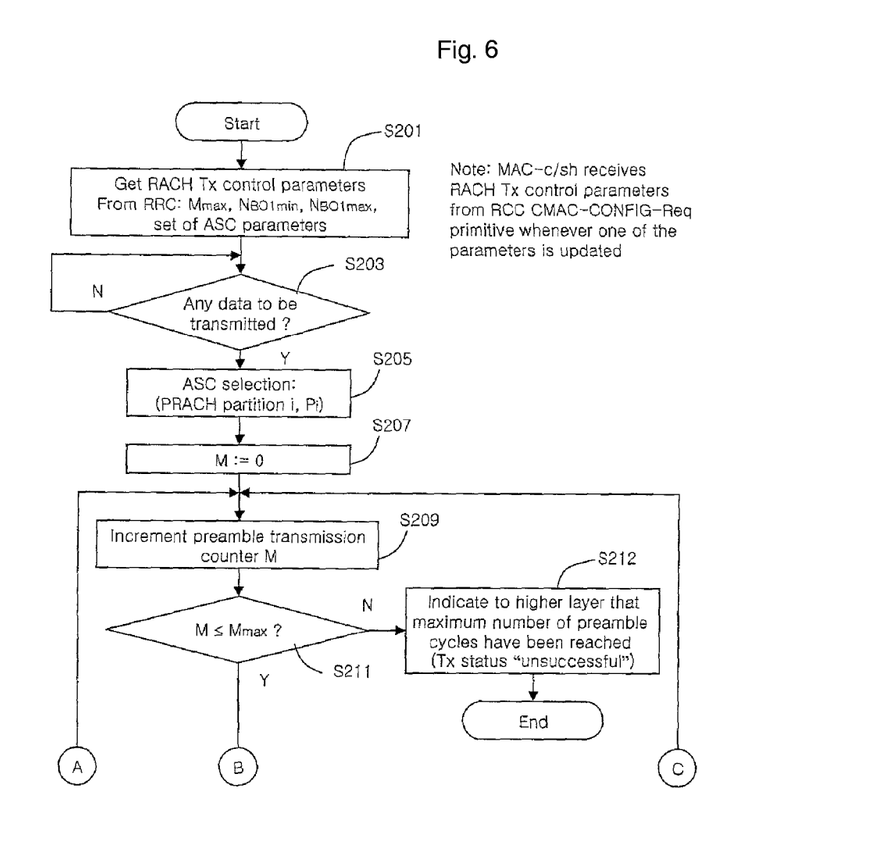
FIGS. 6 and 7 show an exemplary flow chart of the control access procedure.
Figure 7:
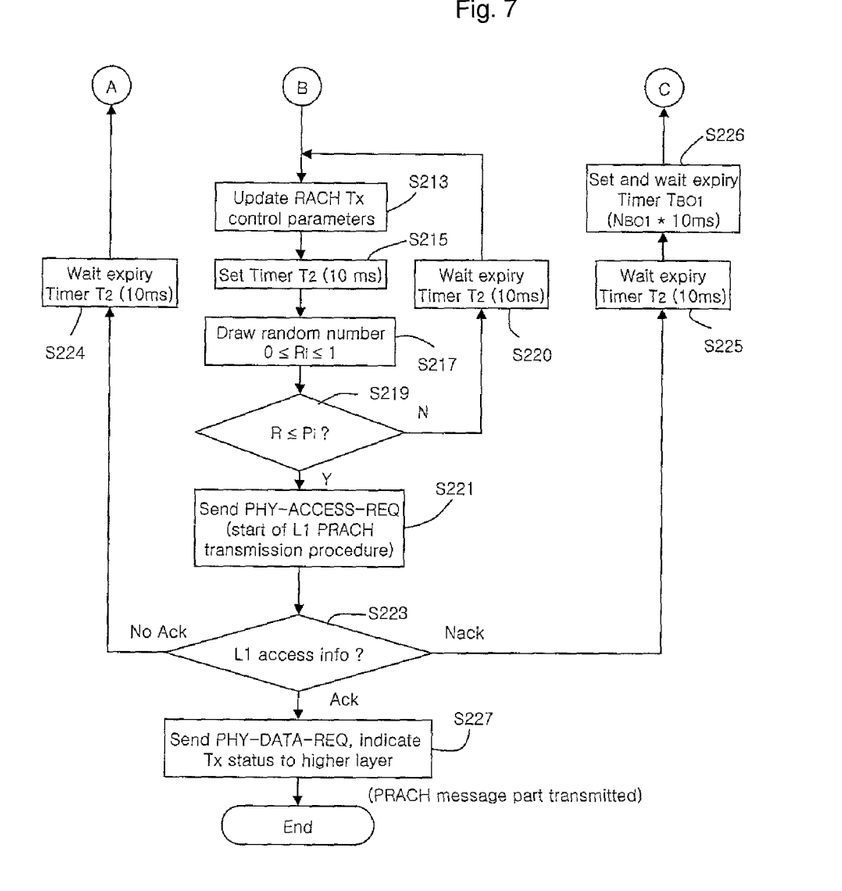

FIGS. 6 and 7 show a flow chart of the control access procedure.

1. Existing specifications provide many RACH transmission control parameters which are stored and updated by the UE based on system information broadcasted by the network. The RACH transmission control parameters include Physical RACH (PRACH), Access Service Class (ASC), a maximum number of preamble ramping cycles $M_{max}$ range of backoff interval for timer $T_{BO1}$ given in terms of numbers of transmission 10 ms time intervals $N_{BO1max}$ and $N_{BO1min}$, applicable when negative acknowledgement on AICH is received (S201).

2. The UE maps the assigned AC to an ASC, and a count value M is set to zero (S203 S205, S207).

3. The count value M is incremented by one (S209). Next, the UE determines if the count value M representing the number of transmission attempts exceeds the maximum number of permitted RACH transmission attempts $M_{max}$ (S211). If so, then the UE treats the transmission as unsuccessful (S212).

4. However, if M is less than or equal to the maximum number of permitted RACH transmission attempts $M_{max}$, then the UE updates the RACH transmission control parameters (S213). In the next step, a 10 ms timer T2 is set (S215). The UE decides whether to attempt transmission based on the persistence value Pi associated with the ASC selected by the UE. Specifically, a random number Ri is generated between 0 and 1 (S217). If the random number Ri is less than or equal to the persistence value Pi, the UE attempts to transmit over the assigned RACH resources, otherwise, the UE waits until the 10 ms timer T2 expires and perform the procedure in step 4 again (S219, S220, S221).

5. When one access attempt is transmitted, the UE determines whether the network responds with an Acknowledgement (ACK), a Non Acknowledgment (NACK), or no response (S223). If no response is received from the network, after the timer T2 expires the process is performed again from step 3 (S224). If a NACK, indicating a failed receipt of the transmission by the network (often due to collision) is received, then the UE waits for the timer T2 to expire then generates a back off value $N_{BO1}$ randomly chosen between the maximum and minimum back off values $N_{BO1max}$ and $N_{BO1min}$ associated with the PRACH assigned to the UE (S225). The UE then waits a back off interval $T_{BO1}$ equal to 10 ms times the back off value $N_{BO1}$ before performing the process from step again (S226). If an ACK, indicating receipt of the UE transmission by the network, is received, then the UE begins the message transmission (S227).

Figure 8:
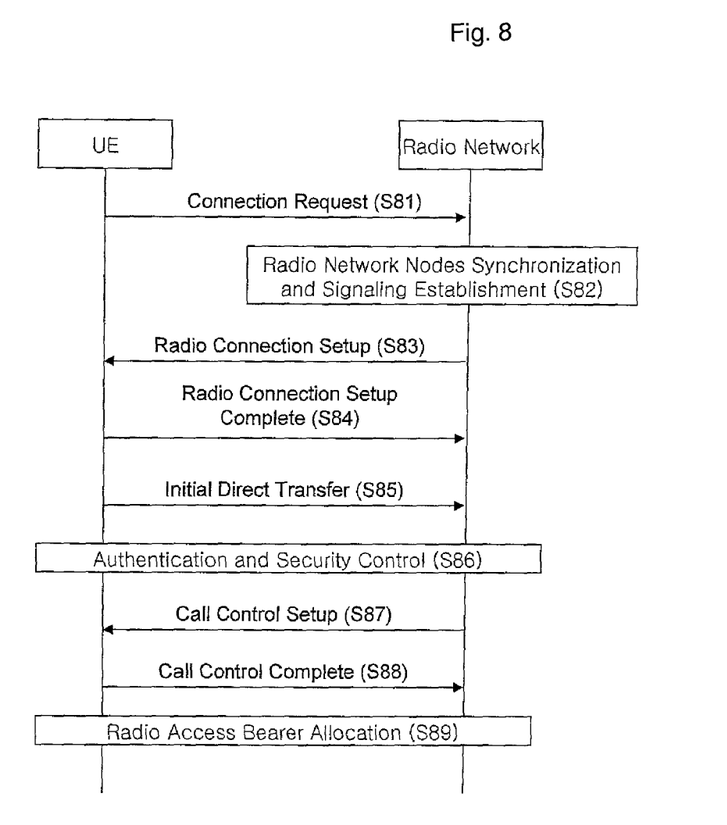
FIG. 8 shows an example of a Signaling Establishment procedure.

FIG. 8 shows an example of Signalling Establishment procedure. Once the PRACH power control preambles have been acknowledged, the RRC Connection Request message can be transmitted (S81). It contains the reason why the connection is requested.

Depending on the request reason, the radio network makes a decision regarding the kind of resources to reserve, and performs synchronization and signaling establishment among certain radio network nodes (i.e. Node B and serving RNC) (S82). When the radio network is ready, it sends to the UE the Connection Setup message conveying information about the radio resources to use (S83). The UE confirms connection establishment by sending the Connection Setup Complete message (S84). When the connection has been established, the UE sends an Initial Direct Transfer message including a large amount of information, such as the UE identity, its current location, and the kind of transaction requested (S85). Then the UE and the network authenticate each other and establish security mode communication (S86). The actual set up information is delivered through the Call Control Setup message (S87). It identifies the transaction and indicates the quality of service (QoS) requirements. Upon receiving the message, the network starts activities for radio bearer allocation by checking if there are enough resources available to satisfy the requested QoS. If yes, the radio bearer is allocated according to the request. If not, the network may select either to continue allocation with a lowered QoS value, or it may select to queue the request until radio resources become available or to reject the call request (S88, S89).

DISCLOSURE OF INVENTION

Technical Problem

However, the present inventor has recognized that improvements to the background art could be made. Namely, one problem that needs to be solved is the delay associated to the random access procedure and the interference level due to network signaling with call establishment.

For example, once the access attempt has been acknowledged by the network, the data message containing the reason for the connection request can be transmitted. If the UE is within an area of poor uplink coverage, then it is possible that the network does not receive this message and does not send a response. In this case, the UE may need to re-transmit this message many times and this can have a significant impact on the call establishment delay and also affect the network interference level.

Technical Solution

A scheme for managing access attempts for communication systems is achieved by deriving a probability of access transmission as a function of both a priority level for access attempts and the purpose(s) for RACH (i.e., random access cause, RACH cause, reason for random access, etc.).

MODE FOR THE INVENTION

One aspect of the present invention is the recognition by the present inventor regarding the problems and drawbacks of the related art described above. Based upon such recognition, the features of the present invention have been developed.

Although the following description will refer to optimized RACH procedures for UMTS merely for the sake of explanation, the features of the present invention are clearly intended to be applicable to various other types of communication methods and systems that would benefit from employing the particular features of the present invention.

One aspect of the invention is to provide priority levels for allowed access attempts on a basis of access class (AC) and the purpose(s) for RACH.

Here, it should be noted that the purpose(s) for RACH may also be referred to by other similar terms and phrases, such as random access cause, RACH cause, establishment cause, reason for random access, and the like. However, it can be clearly understood that such labeling and other terminology are mere exemplary and thus may be clarified (or amended) as a result of ongoing or future discussions in standardization.

Another aspect of the invention is to derive the purpose(s) for RACH from the first phase of access attempt through the various combinations of access resources allocation in frequency domain, in time domain, in code domain, or mixtures thereof. The allocation resources for allowed access attempt can be achieved in several ways, with the most suitable depending on the application or the purpose(s) for RACH and the type of data being transferred or the particular requirement.

The invention could be implemented as part of any fixed or wireless network in order to optimize the random access delay and to reduce the interference level of the associate signaling.

Similar to the background art, all UEs are members of randomly allocated mobile populations, defined as Access Classes (AC). The population number may be stored in the UE (e.g., stored in a SIM/USIM). If the UE is a member of at least one AC which corresponds to the permitted classes as signalled by the network, access attempts are allowed; otherwise access attempts are not allowed.

$$\text{Allowed access attempt} = f(\text{access service class}). \quad \text{Equation (1)}$$

In the present invention, UE derives when to start access attempts, based on the transmission probability on a basis of access service class and also on the basis of access resources allocated to the corresponding purpose(s) for RACH as signalled by the network.

$$\text{Probability of access transmission} = f(\text{access service class, purposes for RACH}). \quad \text{Equation (2)}$$

The particular purpose(s) for RACH for which a UE wants the access determines when the UE is allowed to use access resources. Allocation of access resources should be done through the various combinations of radio resources in frequency domain, in time domain, in code domain, or mixtures thereof.

$$\text{Radio access resource allocation} = f(\text{time and/or frequency and/or code and/or} \ldots). \quad \text{Equation (3)}$$

$$\text{Allowed access resource} = f(\text{Purposes for RACH}). \quad \text{Equation (4)}$$

Access resources should be divided among several purposes for RACH with different priorities. Note that the purposes for RACH could be divided into different purpose for RACH groups depending on the type of data being transferred, such as, traffic class (conversational, background, interactive, streaming); mobility management (location area update, etc.); measurement report, and the like.

Each purpose for RACH represents the transmission priority of the access attempt, so that certain kinds of cause have a higher probability to gain access than other kinds of cause. Allocation of access resources could be fixed or based on a load balancing through the possible establishment cause. Load balancing can be implemented in different ways, for example:

Random Allocation

In a random allocation, access resources are assigned to any purpose for RACH randomly. Such case can lead to overloading of access resources for one purpose for RACH while under allocation of others, since one of the purpose for RACH may be assigned many more access resources during some time period, while the other purpose for RACH are without accesses resources assigned. However, on average, each purpose for RACH gets its share of the load due to the random selection.

Uniform Allocation

Uniform allocation keeps the access resources equally divided among the available purposes for RACH in an orderly fashion. The access resources are allocated on a rotating basis. Allocation of resources for the first purpose for RACH is selected randomly from the list of purposes for RACH. For the following allocations, the selection follows the circular order. Once a purpose for RACH is assigned to access resources, this purpose for RACH is moved to the end of the list.

Weighted Allocation

Weighted allocation is a variant of uniform allocation. In case of a weighted allocation, one can assign a weight to each purpose for RACH in the list so that if one network/operator wants to allocate twice as much access resources to one purpose for RACH as the other, this purpose for RACH gets a weight of two. In such cases, the network/operator can take care of the network capacity and access resources capacity for any purpose for RACH.

The configuration of a load balancing should be decided on the particular requirement. For example, the weighted allocation should be used:
 if some of the purposes for RACH take longer than the others to process;
 to allow access for some purposes for RACH while denying the access to other; and/or
 to control availability of radio resources dedicated for specific services.

However, if the capacity is equally required for all purposes for RACH, uniform allocation will be sufficient.

Accordingly, the access resources in which the UE attempts the access indicate about the purpose(s) for RACH. In such case, the present invention solves the problems of the background art.

No need to transmit or re-transmit the message conveying purpose for RACH, thus: number of signalling message is reduced; and interference level caused by retransmissions is decreased.

Also, collision probability is decreased by: 1/number of purposes for RACH, since the purposes for RACH for which a UE wants the access determines when the UE is allowed to use access resources.

Thus, the overall access delay is decreased compared to the background art.

Figure 9:
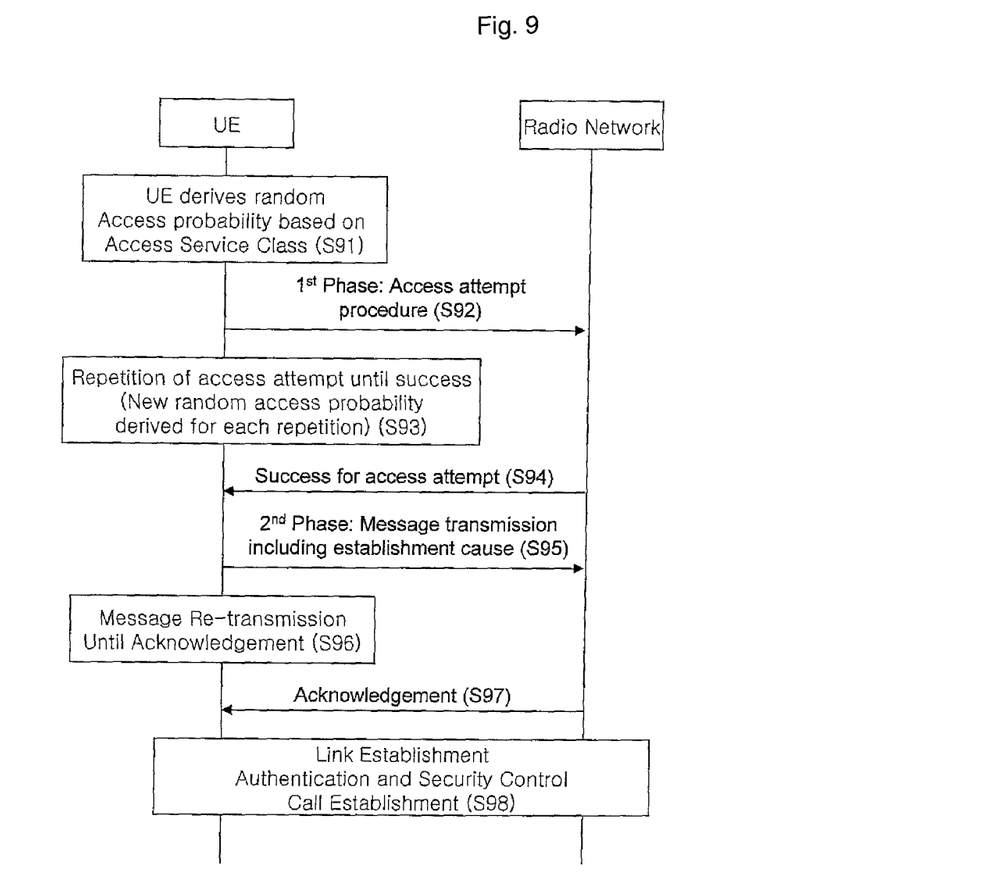
FIG. 9 shows a call establishment procedure of the background art.
Figure 10:
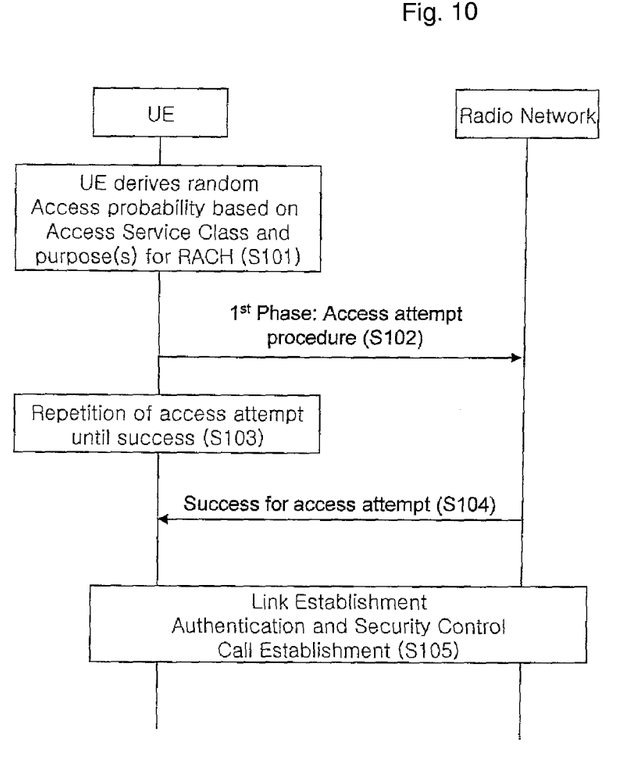
FIG. 10 shows an exemplary call establishment procedure of the present invention.

FIG. 9 shows a call establishment procedure of the background art, and FIG. 10 shows an embodiment of a call establishment procedure of the present invention.

Referring to FIG. 9, the call establishment procedure in the related art required the exchanging of several messages between a mobile terminal (UE: user equipment) and a radio network. The call establishment procedure is divided into two phases.

In the first phase, the UE derives a random access probability on the basis of an access service class (S91). Upon doing so, a message indicating an access attempt procedure is sent to the network (S92). When the access attempt is successful, the network responds by sending a message indicating such to the UE (S94). It can be noted that multiple access attempts may need to be repeatedly performed until it is successful. In these multiple access attempts, a new random access probability is derived for each repetition (S93).

In the second phase, upon receiving the message from the network indicating that the access attempt was successful, the UE then transmits another message that includes the purpose(s) for RACH (i.e., the reason or purpose of call establishment) (S95). Upon proper receipt, the network sends an acknowledgement back to the UE (S97). Here, the sending of the purpose(s) for RACH may need to be repeated until proper acknowledgement from the network is received (S96).

Upon completing the first and second phases, a link establishment authentication and security control for call establishment are performed (S98).

Referring to FIG. 10, the call establishment procedure of the present invention requires a minimal amount of message exchanges between the UE and the network. Here, the related art second phase procedure is not necessary in the present invention.

The UE derives a random access probability on the basis of an access service class and also the purposes for RACH (S101). Upon doing so, a message indicating an access attempt procedure is sent to the network (S102). When the access attempt is successful, the network responds by sending a message indicating such to the UE (S104). It can be noted that multiple access attempts may need to be repeatedly performed until it is successful. In these multiple access attempts, a new random access probability is derived for each repetition (S103).

Thereafter, a link establishment authentication and security control for call establishment are performed (S104, S105).

Thus far, an exemplary scheme for improved access attempts has been described for mobile communication systems. However, the concept and features of the present invention are not limited to wireless system, but has applicability to any communication system having an access protocol for communication resources.

The probability of access transmission is on a basis of both and access service class as well as the purposes for RACH (i.e., random access cause, RACH cause, etc.). The reason for call establishment is derived from the first phase of access attempt through the various combinations of access resources allocation. The particular purpose for RACH for which a UE wants the access determines when the UE is allowed to use access resources.

The present invention may result in a decrease in random access delays, a decrease in collision probability, a reduction in signaling messages, a decrease in interference level caused by a related art establishment cause message transmission, and the like.

Minimizing the call setup delay across the network may be additionally achieved by also improving coverage and reducing the number of retransmissions.

The present invention provides a method of handling access attempts by a network, the method comprising: allocating access resources depending upon at least one random access cause in relation with access service classes; transmitting information about the allocated access resources; and allowing at least one terminal to perform access attempts using the allocated access resources The method may further comprise: deriving the random access cause from a preamble in an access burst received from the terminal. The deriving step may comprise: using radio resources divided among several random access causes or groups of random access causes with different priorities. The allocating step may comprise allocation of access resources in a fixed or dynamic manner. The dynamic allocation of access resources may be based on load balancing. The load balancing may be performed through random access causes. The load balancing may be implemented by at least one of a group comprising random allocation, uniform allocation and weighted allocation. The network may know how to reserve appropriate resources for a traffic channel depending on the ransom access cause. The ransom access cause may be derived from a first phase of an access attempt through various combinations of access resource allocation in frequency domain, in time domain, or both. The access resource allocation may also depend on the type of data being transferred.

Also, the present invention provides a method of handling access attempts by a terminal, the method comprising: receiving parameters about access attempts from a network; receiving information about radio access resources for each random access cause; and attempting random access on a basis of an access service class and a random access cause.

The attempting step may be performed in a given window period if time division multiplexing is used. The attempting step may comprise: transmitting a preamble in an access burst related to the random access cause. The access service class may be used to derive a random access attempt, and the random access cause is used to derive which access resources are to be used.

Additionally, the present invention provides a radio interface protocol stack comprising: a protocol entity adapted to derive a probability of access transmission as a function of both a priority level for access attempts and a random access cause, and to perform link establishment authentication and security control call establishment based upon the deriving.

The priority level may be defined as an access service class indicating a randomly allocated mobile population number. The random access cause may be defined as a purpose for RACH. The protocol stack wherein the features may be implemented in a mobile terminal. The deriving step may comprise: receiving parameters about access attempts from a network; and receiving information about radio access resources for each random access cause. The protocol entity may be implemented in a network entity. The deriving step may comprise: allocating access resources depending upon at least one random access cause in relation with access service classes; and transmitting, to a mobile terminal, information about the allocated access resources.

It should be noted that the features of the present invention are related to at least the 3GPP standard. Certain relative portions of the 3GPP specification, such as 22.011 (=GSM 02.11), 25.321, 25.331 related to the Medium Access Control (MAC) protocol specification, V6.5.0 and their related sections or portions thereof, as well as various developing enhancements thereof pertain to the present invention. Such standards are part of the embodiments of the present invention and constitute part of the present disclosure by being incorporated herein by reference.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of handling random access, the method comprising:
transmitting, by a network, information regarding one or more access service classes;
allocating, by the network, access resources based on one or more purposes for attempting the random access, with respect to the one or more access service classes,
wherein the one or more purposes for attempting the random access comprise at least mobility management or measurement report;
transmitting, by the network, information regarding the allocated access resources; and
receiving, by the network, an initial random access attempt corresponding to a determination of a random access probability, the determination of the random access probability being an arithmetic function of both the information regarding the one or more access service classes and the information regarding the allocated access resources,
wherein receiving the initial random access attempt comprises receiving an access burst comprising a preamble,
wherein the method further comprises deriving a purpose corresponding to the initial random access attempt from the preamble, and
wherein deriving the purpose comprises using radio resources divided among the one or more purposes or groups of the one or more purposes having different priorities.

2. The method of claim 1 wherein allocating the access resources comprises allocating the access resources in a fixed manner or a dynamic manner.

3. The method of claim 2, wherein allocating the access resources comprises allocating the access resources in a dynamic manner based on load balancing.

4. The method of claim 3, wherein allocating the access resources in the dynamic manner based on load balancing comprises performing load balancing of the one or more purposes.

5. The method of claim 3, wherein the load balancing is implemented by at least random allocation, uniform allocation or weighted allocation.

6. The method of claim 1 wherein allocating the access resources comprises reserving appropriate resources for a traffic channel depending on one of the one or more purposes.

7. The method of claim 1
wherein allocating the access resources comprises allocating the access resources with respect to at least frequency or time, and
wherein the method further comprises deriving a purpose corresponding to the received initial random access attempt from the received initial random access attempt.

8. The method of claim 7, wherein allocating the access resources further comprises allocating the access resources based on a type of data that is transferred.

9. A method of attempting random access to a network, the method comprising:
receiving, by a terminal, information regarding one or more access service classes;
receiving, by the terminal, information regarding access resources allocated based on one or more purposes for attempting the random access to the network, wherein the one or more purposes for attempting the random access comprise at least mobility management or measurement report;

determining, by the terminal, a random access probability as an arithmetic function of both the received information regarding the one or more access service classes and the received information regarding the access resources allocated based on the one or more purposes; and performing, by the terminal, an initial random access attempt according to the determined random access probability, wherein performing the initial random access attempt according to the determined random access probability comprises:

performing the initial random access attempt according to the determined random access probability during a specific window period; and transmitting an access burst comprising a preamble to the network.

10. The method of claim 9, wherein performing the initial random access attempt comprises using one or more of the allocated access resources, the use of the one or more of the allocated access resources indicating a purpose corresponding to the initial random access attempt.

* * * * *